(12) United States Patent
Herberholt et al.

(10) Patent No.: US 7,535,706 B2
(45) Date of Patent: May 19, 2009

(54) MULTI-PURPOSE DOCKING SYSTEM

(75) Inventors: Steven J. Herberholt, Chesterfield, MO (US); Craig Watson, Edwardsville, IL (US)

(73) Assignee: Innoventor Engineering, Inc., St. Louis, MO (US)

( * ) Notice: Subject to any disclaimer, the term of this patent is extended or adjusted under 35 U.S.C. 154(b) by 266 days.

(21) Appl. No.: 11/499,491

(22) Filed: Aug. 4, 2006

(65) Prior Publication Data

US 2007/0030645 A1 Feb. 8, 2007

Related U.S. Application Data

(60) Provisional application No. 60/705,618, filed on Aug. 4, 2005.

(51) Int. Cl.
*G06F 1/16* (2006.01)
(52) U.S. Cl. ...................................... 361/686
(58) Field of Classification Search ................. 361/686; 439/34; 340/431; 244/172.4; 144/312; 405/190
See application file for complete search history.

(56) References Cited

U.S. PATENT DOCUMENTS

| | | | |
|---|---|---|---|
| 3,608,848 A | 9/1971 | Cantor et al. | |
| 3,927,760 A * | 12/1975 | McCall ..................... | 198/687.1 |
| 4,080,025 A * | 3/1978 | Garnier et al. .............. | 439/191 |
| 4,119,051 A | 10/1978 | Orndorff, Jr. | |
| 4,807,834 A | 2/1989 | Cohen | |
| 5,042,429 A | 8/1991 | Deitrich et al. | |
| 5,343,295 A | 8/1994 | Lara et al. | |
| 5,552,701 A | 9/1996 | Veteran et al. | |
| 6,223,675 B1 * | 5/2001 | Watt et al. .................... | 114/312 |
| 6,600,695 B1 * | 7/2003 | Nugent et al. ............... | 367/131 |
| 6,712,619 B2 | 3/2004 | Marshall et al. | |
| 2005/0128059 A1 | 6/2005 | Vause | |

* cited by examiner

*Primary Examiner*—Chandrika Prasad
(74) *Attorney, Agent, or Firm*—Armstrong Teasdale LLP

(57) ABSTRACT

A docking system that includes a male member including a first component, a female member including a second component, and a static base including a suspension mechanism is provided. One of the male member and the female member are suspended from the suspension mechanism to allow the one of the male member and the female member to move to correct variations between the female member and the male member to allow coupling the first component and the second component when the female member and the male member are coupled.

20 Claims, 8 Drawing Sheets

MULTI-PURPOSE DOCKING SYSTEM

CROSS REFERENCE TO RELATED APPLICATIONS

This application claims the benefit of U.S. provisional application No. 60/705,618 filed Aug. 4, 2005, which is herein incorporated by reference in its entirety.

BACKGROUND OF THE INVENTION

This invention relates generally to physical interfaces between any type of unassisted interconnections that occur between two bodies, and more specifically to a multi-purpose docking system configured to allow transfer of any type of medium, for example, electronic data, electricity, fluid, and air between two bodies.

There are few known docking station assemblies that are currently available. Many of these docking station assemblies are limited in their capabilities and typically only accomplish one task, for example, the charging of an electrically operated vehicle. Such a docking station might include a static structure located at a specific location and attached to an AC power source. Attached to this static structure is some mechanism, which is sometimes referred to as a receptor. A mobile vehicle "docks" at this static location and receives a charge. Once the charge is completed, the vehicle might then move to other locations accomplishing various tasks. Other methods to charge a mobile vehicle might take advantage of in-floor or overhead rails that supply an AC charge to an on-board charger on a mobile vehicle as it passes over or under the rail. However, these systems typically provide no provisions for additional types of medium transfer, and the vehicle must typically follow set paths to maintain opportunities to contact the rails.

BRIEF DESCRIPTION OF THE INVENTION

In one aspect, a docking system is provided. The docking system includes a male member including a first component, a female member including a second component, and a static base including a suspension mechanism. One of the male member and the female member are suspended from the suspension mechanism to allow the one of the male member and the female member to move to correct variations between the female member and the male member to allow coupling the first component and the second component when the female member and the male member are coupled.

In another aspect, a base is provided. The base includes one of a male member including a first component and female member including a second component. The base also includes a suspension mechanism to suspended the one of the male member and the female member to allow the one of the male member and the female member to move to correct variations between the male member and the female member to allow coupling the first component and the second component when the female member and the male member are coupled.

In a further aspect, a method of assembling a docking system is provided. The method includes coupling a first component within a male member, coupling a second component within a female member, and coupling a suspension mechanism to a static base. The method also includes suspending one of the male member and the female member from the suspension mechanism to allow the one of the male member and the female member to move to facilitate correcting variations between the male member and the female member to allow coupling the first component and the second component when the female member and the male member are coupled.

DETAILED DESCRIPTION OF THE INVENTION

In a specific embodiment, an interconnect station or docking system, includes a male cone, a female receptor, and a static base from which one of the male cone portion and female receptor portion are suspended. Contained within the male cone and female receptor are provisions for any type of medium transfer, and means for accommodating hysteresis. The docking system allows for proper mating of various types of connections, or sub-components, within the female receptor and male cone. These sub-components must typically be pre-aligned before an engagement or connection can be made. The docking system as a whole accomplishes a pre-alignment of the sub-components, and then subsequent connecting of the sub-components. This design allows for proper alignment in multiple axes, although some sub-components may not require the described level of alignment to properly engage or mate with one another.

Figure 1:
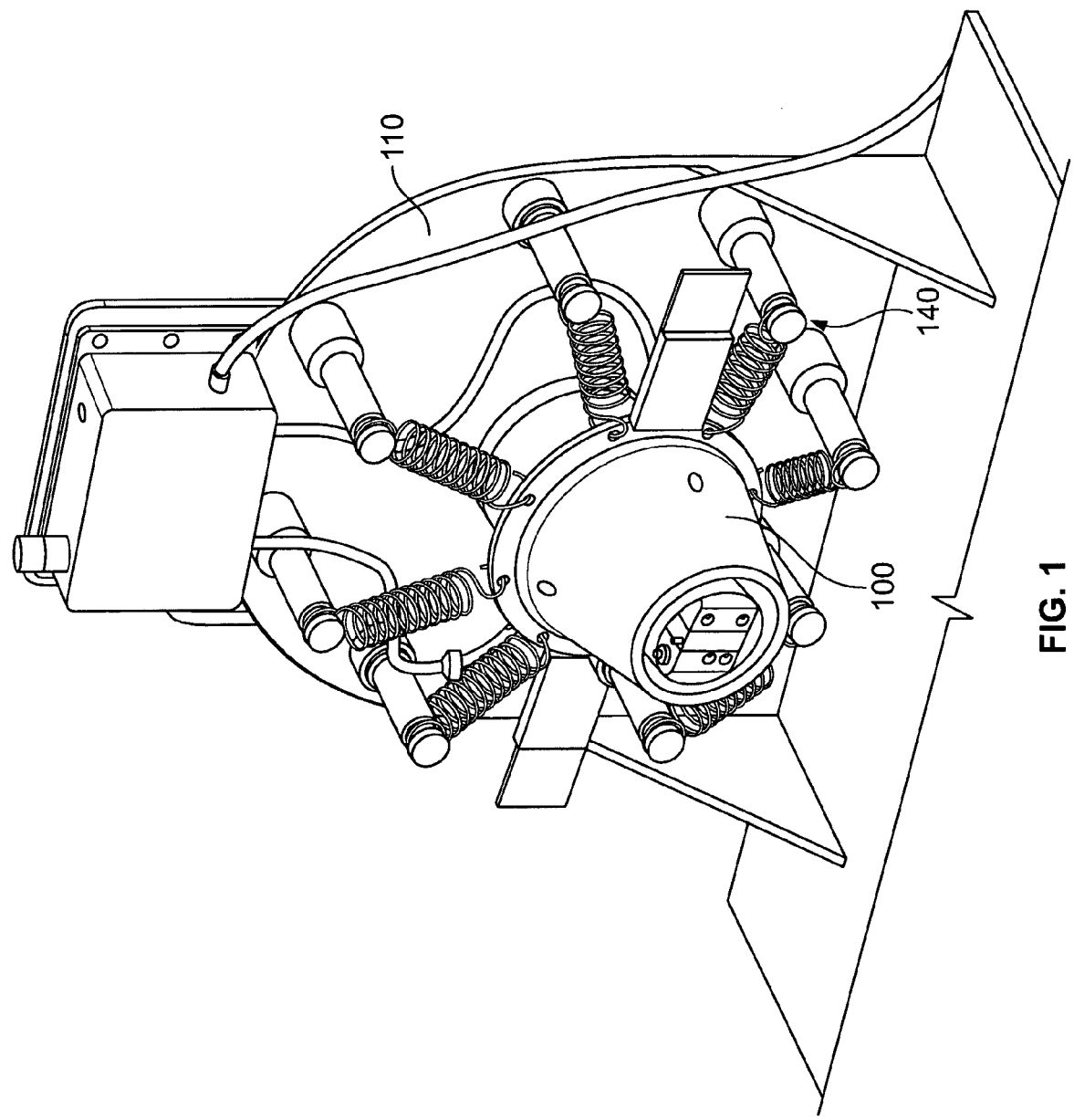
FIG. 1 is an illustration of a male cone portion of a docking system suspended from a static base.

Now referring specifically to FIG. 1, an example of a male cone portion 100 suspended within a static base 110, or station, of a docking system (not shown in FIG. 1) is shown. In one embodiment, a docking system assembly might include male cone portion 100, a female receptor portion (not shown in FIG. 1), and static base 110 to which either male cone portion 100 or the receptor is attached. The remaining male cone portion 100 or receptor is mounted to a vehicle.

Figure 2:
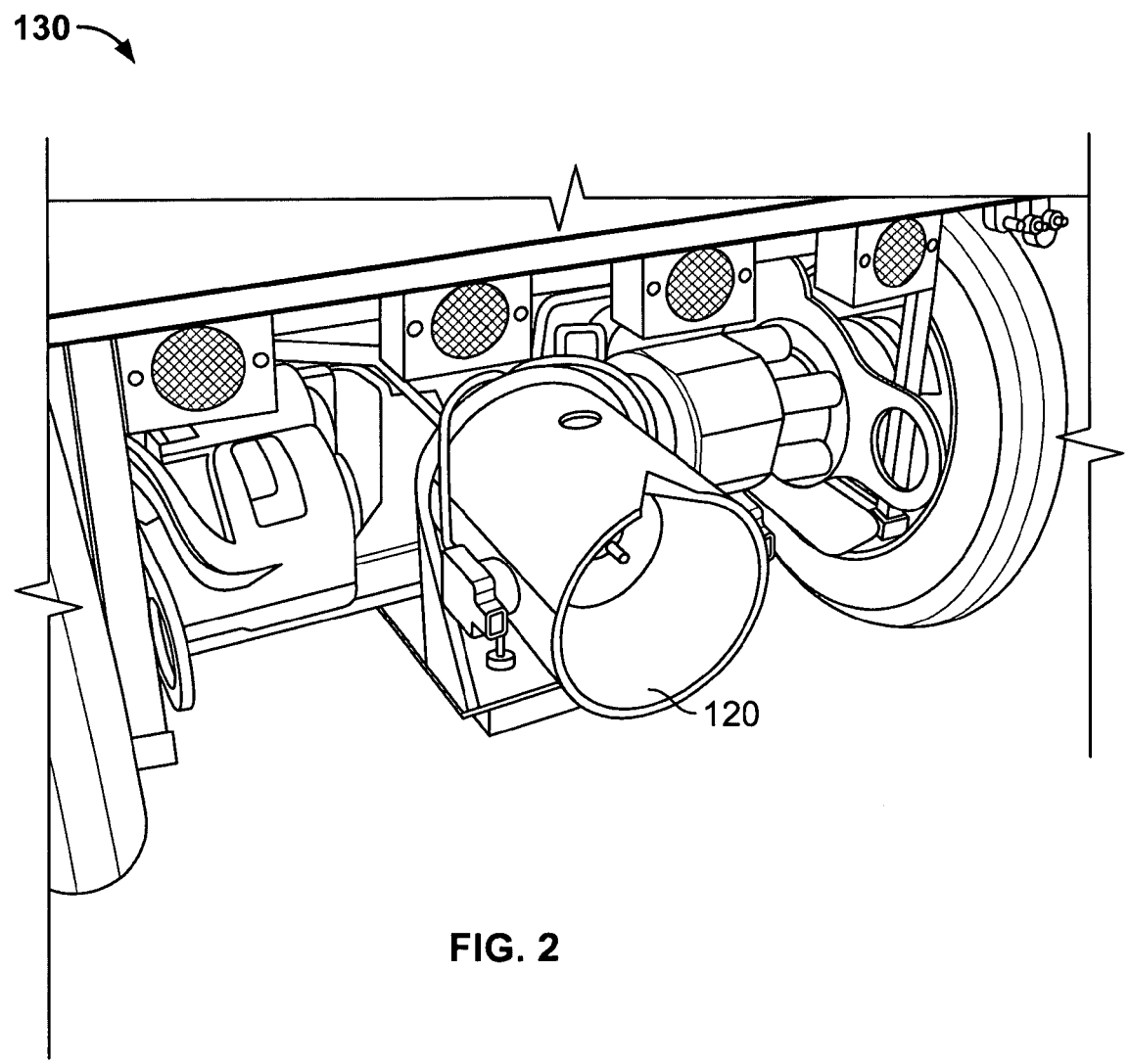
FIG. 2 is an illustration of a female receptor portion of a docking system mounted on a vehicle.

FIG. 2 is an example of a female receptor portion 120 attached to a vehicle 130. To accommodate variations in height and/or width and/or angularity between male cone portion 100 and female receptor portion 120, either male cone portion 100 or female receptor portion 120 might be suspended from static base 110 utilizing springs (as shown in FIG. 1) or by a similar method. In the illustrated embodiment of FIG. 1, male cone portion 100 is suspended from a plurality of springs 140 that are mounted from base station 110 such that a substantially circular pattern is formed around male cone portion 100.

Figure 3:
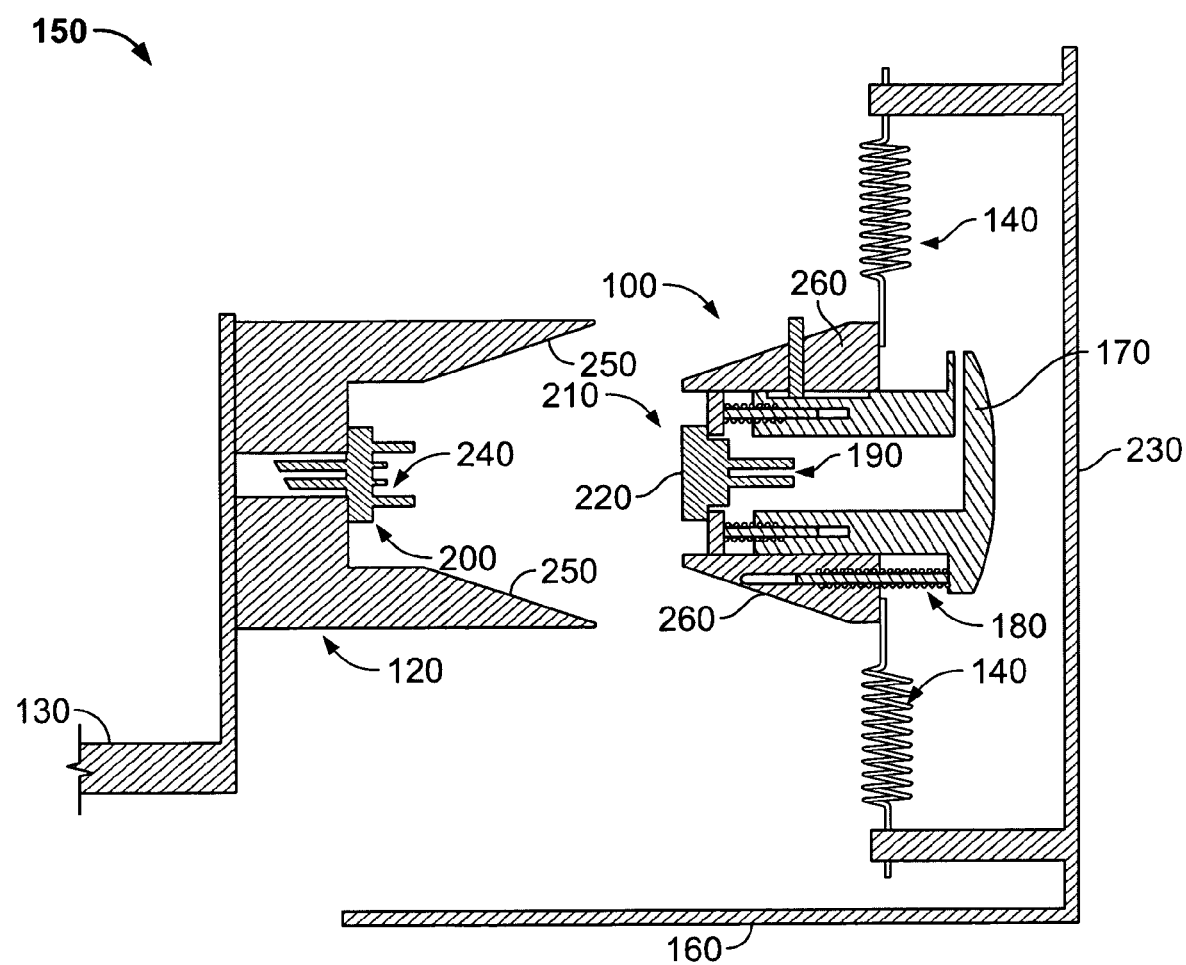
FIG. 3 is a side view of the docking system.

FIG. 3 is a side view schematic illustration of docking system 150. In the embodiment illustrated, docking system 150 includes male cone portion 100, female receptor portion 120, base 160 (to which either male cone portion 100 or female receptor portion 120 is attached), a vehicle 130 (to which the other of male cone portion 100 or female receptor portion 120 is attached), a piston 170 that is slidably engaged with male cone portion 100, an inner spring assembly 180 that biases the piston 170 with respect to male cone portion 100, male cone sub-components 190, and female receptor sub-components 200.

Docking system 150 provides for proper mating of various types of connections, or sub-components 190 and 200, within female receptor portion 120 and male cone portion 100. In known docking systems, sub-components 190 and 200 are typically pre-aligned before an engagement or connection is made. Docking system 150 as a whole accomplishes a pre-alignment of sub-components 190 and 200, and then subsequent connecting of sub-components 190 and 200. This configuration allows for proper alignment in multiple axis, although some sub-components 190 and 200 may not require this to properly engage or mate.

The shape of the interface between male cone portion 100 and female receptor portion 120 assures positive pre-alignment, and subsequent positive alignment of sub-components 190 and 200 within male cone portion 100 and receptor assemblies 120. Referring again to FIG. 1, as male cone portion 100 is suspended from the springs 140, it is free to move back and forth coaxially. In a center area 210 of male cone portion 100, an interface 220 (e.g., sub-components) is mounted. In one embodiment, interface 220 includes one or more of an electrical, air, fluid, or electronic data interface. Interface 220 is mounted to docking station 150 such that as female receptor portion 120 engages male cone portion 100, male cone portion 100 is forced towards a back wall 230 of docking station 150, which results in interface 220 extending from male cone portion 100. The movement of male cone portion 100 relative to interface 220 helps to provide a positive contact between interface 200 and a similar interface 240 mounted coaxially with female receptor portion 120.

In FIG. 3, vehicle 130 with female receptor portion 120 approaches male cone portion 100, which is suspended by springs 140 (or some other flexible device) to base 160. Springs 140 allow for variations in one or more of height, width, angularity, and rotation between female receptor portion 120 and male cone portion 100. Female receptor portion 120 contacts male cone portion 100 and if there is misalignment between the two, springs 140 allow male cone portion 100 to "adjust and align" as an inner surface 250 of female receptor portion 120 and an outer surface 260 of male cone portion 100 make contact.

Figure 4:
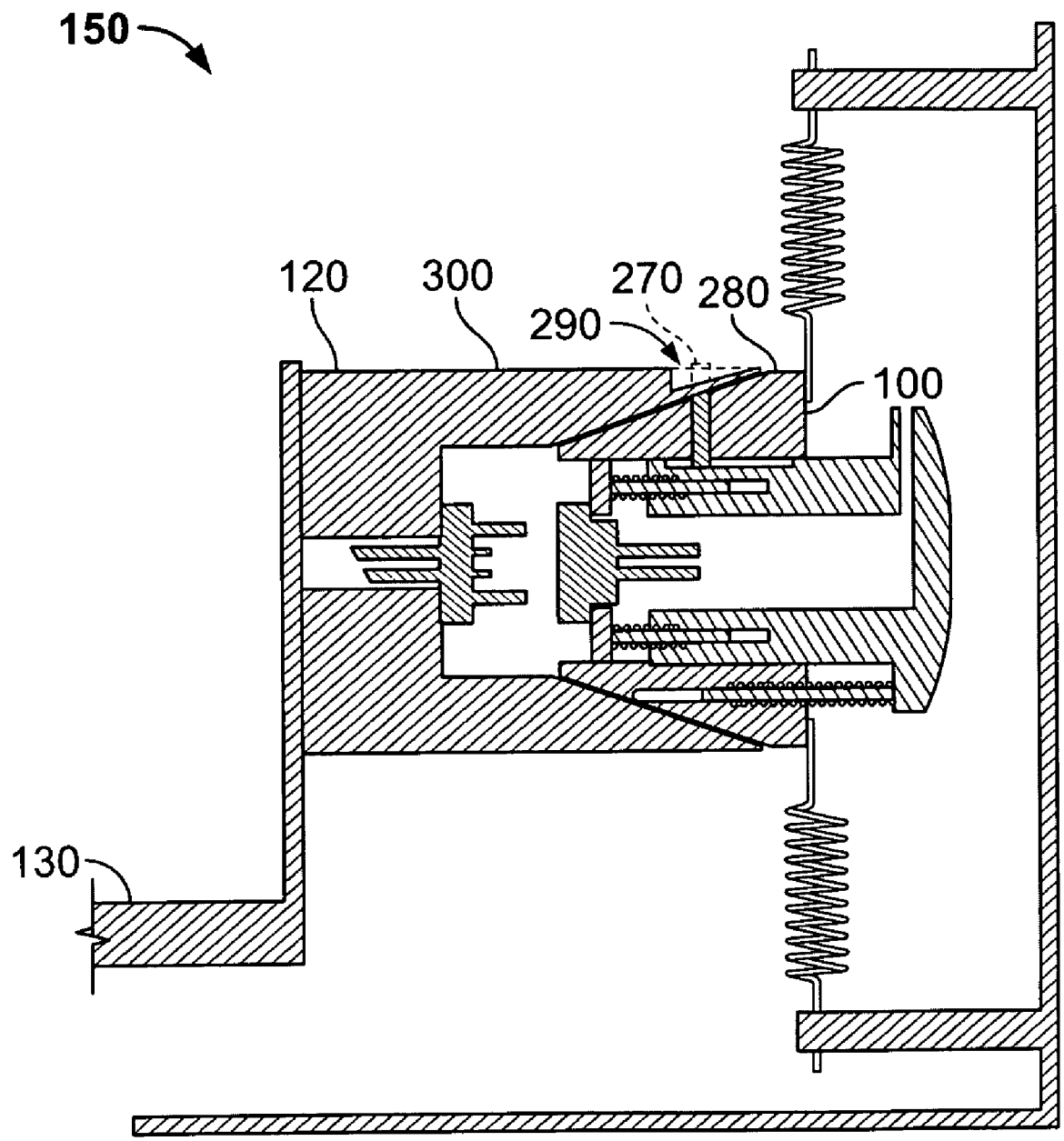
FIG. 4 is a side view illustration of the docking system after engagement of the female receptor and male cone.

FIG. 4 is a side view schematic illustration of docking system 150 after an engagement of female receptor portion 120 and male cone portion 100. As illustrated, a dowel pin 270 located in a top 280 of male cone portion 100 starts to seat itself within a v-channel 290 located in the top 300 of female receptor portion 120, allowing for variations in rotation between female receptor portion 120 and male cone portion 100. As an example, one tire on vehicle 130 may have lower air pressure than another, which causes a slight rotation of vehicle 130. At this point, male cone portion 100 and female receptor portion 120 are now fully engaged with one another and sub-components 190 and 200 are now properly aligned, although they have not been engaged or connected with one another.

Figure 5:
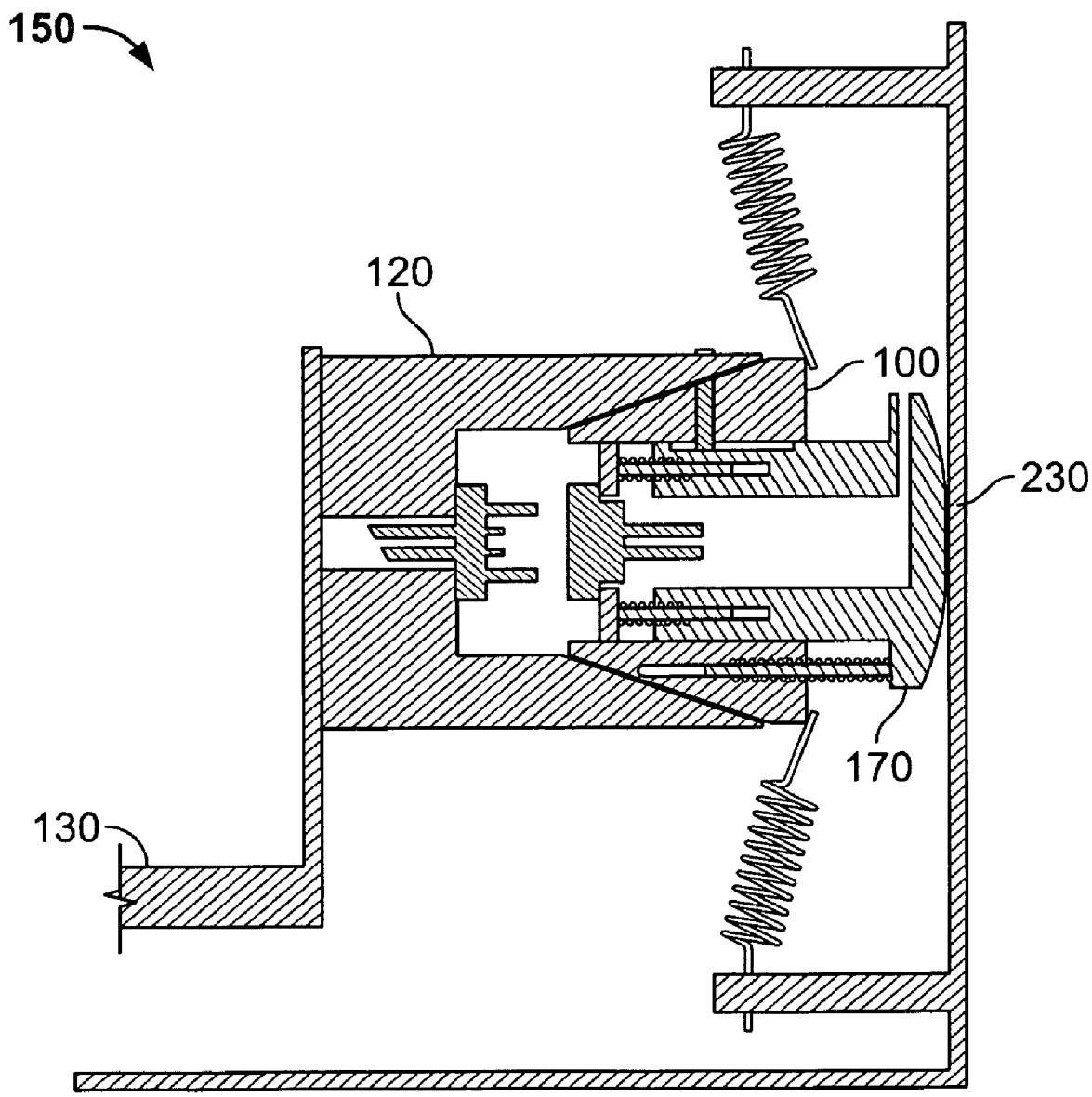
FIG. 5 is a side view illustration of full engagement of the male cone and the female receptor.

FIG. 5 illustrates further engagement of male cone portion 100 and female receptor portion 120. As vehicle 130, which includes female receptor portion 120, continues to move toward male cone portion 100, piston 170 moves accordingly until it touches vertical wall 230.

Figure 6:
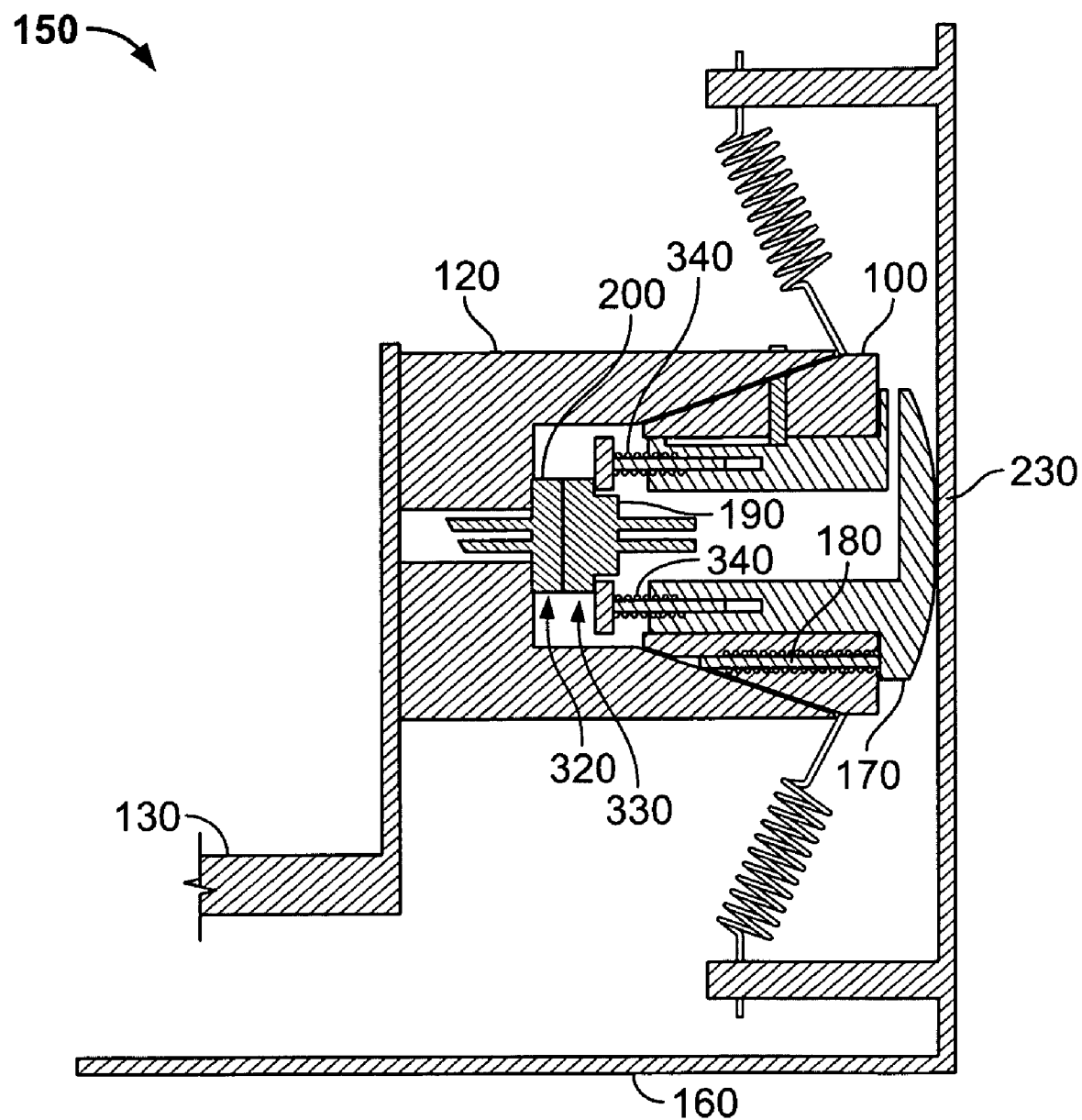
FIG. 6 is a side view illustration of further operation of the docking system with the male cone and female receptor fully engaged while the vehicle continues to move toward the male cone and base assembly.

FIG. 6 illustrates further operation of docking system 150 with male cone portion 100 and female receptor portion 120 fully engaged while vehicle 130 continues to move toward male cone portion 100 and base assembly 160. As piston 170 touches base 160, and vehicle 130 continues to move towards base 160, the receptor/cone assembly moves towards vertical wall 230, while piston 170 stays stationary. This movement causes inner spring assembly 180 to compress. More specifically, male cone portion 100 reengages piston 170. Another result is that subcomponents 190 and 200 start to engage and form a connection. As illustrated in FIG. 6, sub-component 200, in one embodiment, includes alignment pins 320, which engage openings 330 on sub-component 190. Such an arrangement allows for additional floating and flexibility of sub-components 190 and 200. In the illustrated embodiment, sub-component 190 is attached to a spring set 340 which is compressed somewhat as sub-components 190 and 200 make a final connection. In an alternative embodiment, subcomponents 190 and 200 do not utilize alignment pins 320 and spring set 340.

The above described configuration allows for all components of the entire assembly to be flexible and eliminates any potential damage due to hard stops. At some point, a signal is given back to vehicle 130, which recognizes that the sub-components have properly engaged or connected, and the vehicle movement can then stop. Some vehicles 130 may move back slightly after ceasing movement (which is referred to herein as hysteresis), such that compression on spring set 340 is reduced to facilitate maintaining the connection of sub-components 190 and 200.

Figure 7:
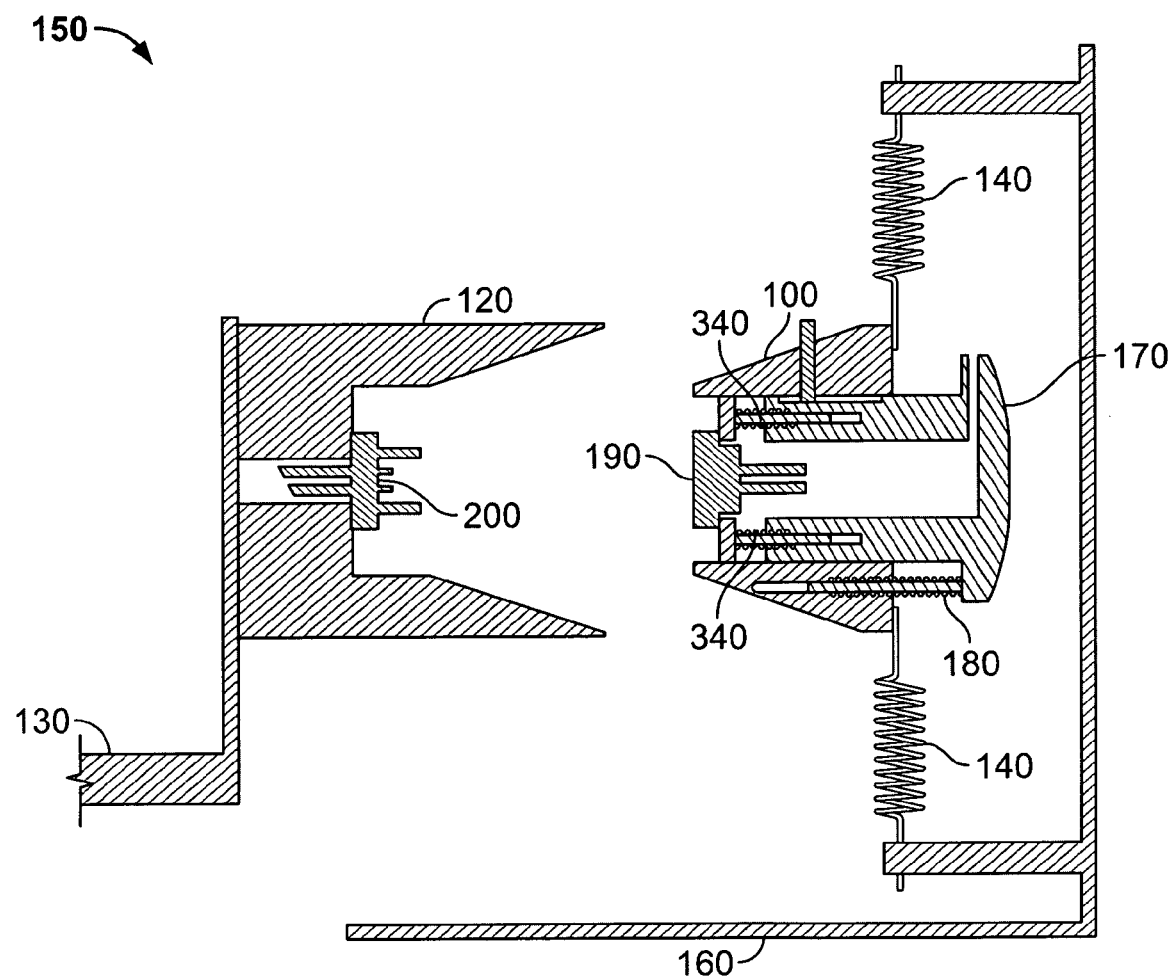
FIG. 7 is a side view illustration of the docking system once the male cone and female receptor have disengaged.

FIG. 7 is a side view schematic illustration of docking system 150 once male cone portion 100 and female receptor portion 120 have disengaged. Once a task has been completed, vehicle 130 moves away from base 160 (and male cone portion 100). Any compression in spring set 340 is removed, and sub-components 190 and 200 start to release. As vehicle 130 continues moving away from base 160, inner spring assembly 180 pushes male cone portion 100 back to its original position relative to piston 170. As female receptor portion 120 and male cone portion 100 continue to disengage, as illustrated, springs 140 cause male cone portion 100 to retain its original position with respect to base 160.

Figure 8:
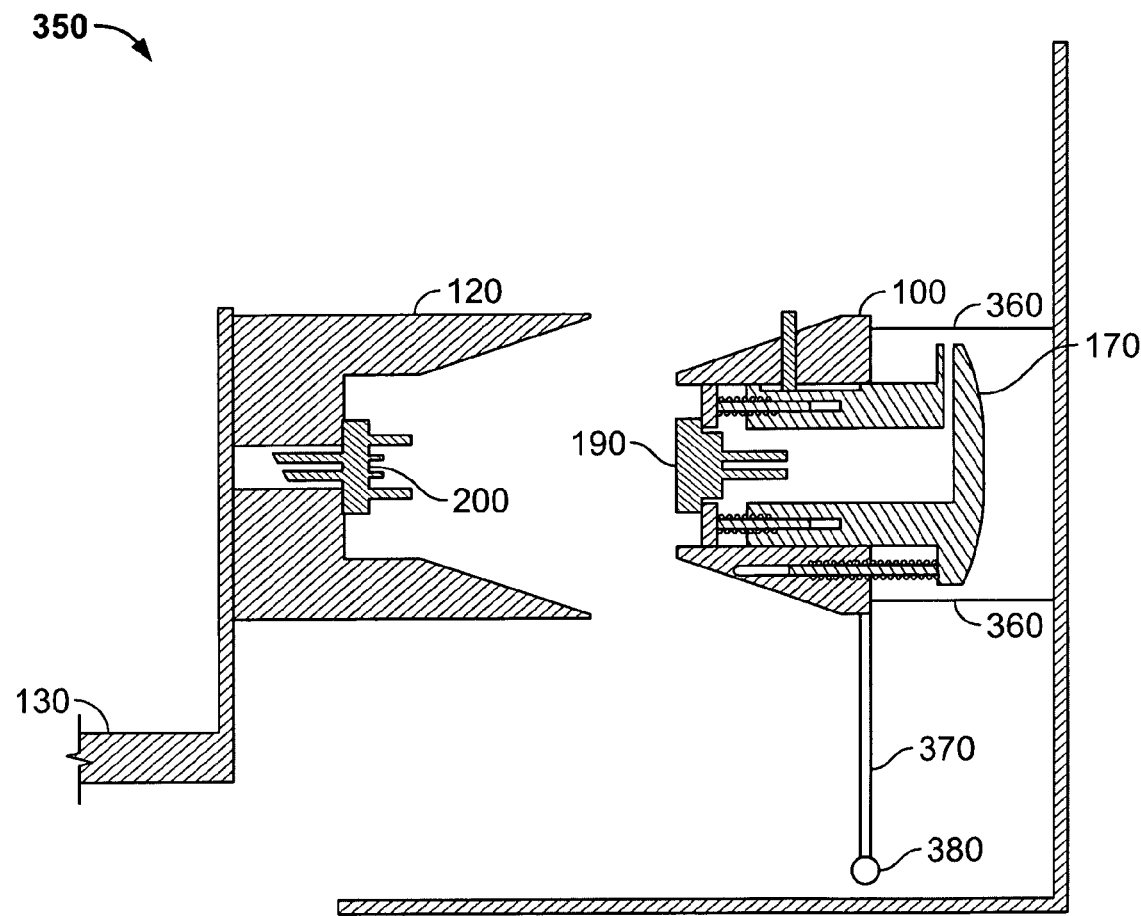
FIG. 8 is a side view of an alternative docking system.

FIG. 8 is a side view schematic illustration of an alternative docking system 350. Docking system 350 includes a magnetized male cone portion 100 and female receptor portion 120. Further, docking system 350 does not include springs 140, but rather male cone portion 100 is coupled to a flexible housing 360. Male cone portion 100 also includes a support leg 370 extending to the floor. Support leg 370 includes a pivoting wheel 380 coupled thereto, such that male cone portion 100 is freely movable within flexible housing 360. In this alternative embodiment, male cone portion 100 and female receptor portion 120 are aligned using the magnetic force of both male cone portion 100 and female receptor portion 120. Further, piston 170 of this embodiment operates as described above. In addition, sub-components 190 and 200 of male cone portion 100 and female receptor portion 120 also operate and couple as described above with regard to FIGS. 3-7. In an alternative embodiment, male cone portion 100 is coupled to vehicle 130 and female receptor portion 120 is coupled to the flexible housing 360. In an additional alternative embodiment, magnetized male cone portion 100 and magnetized female receptor portion 120 are used with springs 140 of docking system 150.

In one embodiment, a method of coupling a first component and a second component of a system is provided. The method includes coupling the first component within a male member, coupling the second component within a female member, and providing a static base including a suspension mechanism. The method also includes suspending one of the male member and the female member from the suspension mechanism, and coupling the female member and the male member such that the suspension system allows the one of the male member and the female member to move to facilitate correcting variations between the male member and the female member to facilitate coupling the first component and the second component.

In another embodiment, a method of assembling a docking system is provided. The method includes coupling a first component within a male member, coupling a second component within a female member, and coupling a suspension mechanism to a static base. The method also includes suspending one of the male member and the female member from the suspension mechanism to allow the one of the male member and the female member to move to facilitate correcting variations between the male member and the female member to allow coupling the first component and the second component when the female member and the male member are coupled.

The above described embodiments facilitate reducing or eliminating the need for human interaction for coupling and/or decoupling of the components of a docking station assembly. As a result, the need for human interaction to assist in medium transfer is also eliminated. Removal and/or replacement of batteries or other mediums that might require replacement as a result of use is also reduced as the docking station assembly may be configured to provide a battery charging voltage to the vehicles that dock at the docking station. The potential for inadvertent electrical shocks from components of the described docking station assembly are also reduced as in certain embodiments, specific components of the docking station are shielded.

While the invention has been described in terms of various specific embodiments, those skilled in the art will recognize that the invention can be practiced with modification within the spirit and scope of the claims.

What is claimed is:

1. A docking system comprising:
   a male member including a first component;
   a female member including a second component; and
   a static base including a suspension mechanism comprising a plurality of flexible devices having a first end and a second end, said flexible devices attached at the first end to said static base, one of said male member and said female member suspended about a perimeter thereof through attachment to the second end of said flexible devices to allow said one of said male member and said female member to move to correct variations between said female member and said male member to allow coupling said first component and said second component when said female member and said male member are coupled.

2. A docking system in accordance with claim 1 wherein said first component and said second component each include at least one of an electrical interface, an air interface, a fluid interface, and an electronic data interface.

3. A docking system in accordance with claim 1 wherein said flexible devices comprise a plurality of springs.

4. A docking system in accordance with claim 1 wherein said suspension mechanism includes a flexible housing.

5. A docking system in accordance with claim 1 wherein both said male member and said female member include a magnetized surface to facilitate coupling said male member and said female member.

6. A docking system in accordance with claim 1 wherein one of said female member and said male member includes an extension member and the other of said female member and said male member includes a channel, said extension member configured to engage said channel when said female member and said male member are coupled.

7. A docking system in accordance with claim 1 wherein said docking system corrects variations including at least one of a height variation, a width variation, an angularity variation, and a rotational variation between said female member and said male member.

8. A base comprising:
   one of a male member including a first component and a female member including a second component; and
   a suspension mechanism comprising a plurality of flexible devices having a first end and a second end, said flexible devices attached at the first end to said base and at the second end to suspend said one of said male member and said female member, about a perimeter thereof, to allow said one of said male member and said female member to move to correct variations between said male member and said female member to allow coupling said first component and said second component when said female member and said male member are coupled.

9. A base in accordance with claim 8 wherein said first component and said second component each include at least one of an electrical interface, an air interface, a fluid interface, and an electronic data interface.

10. A base in accordance with claim 8 wherein said suspension mechanism includes a plurality of springs.

11. A base in accordance with claim 8 wherein said suspension mechanism includes a flexible housing.

12. A base in accordance with claim 8 wherein both said male member and said female member include a magnetized surface to facilitate coupling said male member and said female member.

13. A base in accordance with claim 8 wherein one of said female member and said male member includes an extension member and the other of said female member and said male member includes a channel, said extension member configured to engage said channel when said female member and said male member are coupled.

14. A base in accordance with claim 8 wherein said docking system corrects variations including at least one of a height variation, a width variation, an angularity variation, and a rotational variation between said female member and said male member.

15. A method of assembling a docking system, said method comprising:
   coupling a first component within a male member;
   coupling a second component within a female member;
   coupling a first end of a plurality of flexible devices to a static base; and
   suspending one of the male member and the female member about the perimeter of the member by attaching the a second end of the flexible members thereto to allow the suspended one of the male member and the female member to move to facilitate correcting variations between the male member and the female member to allow coupling the first component and the second component when the female member and the male member are coupled.

16. A method in accordance with claim 15 wherein coupling the first component and the second component further comprises coupling at least one of an electrical interface, an air interface, a fluid interface, and an electronic data interface.

17. A method in accordance with claim 15 wherein coupling a first end of a plurality of flexible devices to a static base further comprises coupling springs to the static base.

18. A method in accordance with claim 15 further comprising magnetizing both the male member and the female member to facilitate coupling the male member and the female member.

19. A method in accordance with claim 15 further comprising:

coupling an extension member to one of the female member and the male member; and forming a channel within the other of the female member and the male member, the extension member configured to engage the channel when the female member and the male member are coupled.

20. A method in accordance with claim 15 wherein correcting variations further comprises correcting at least one of a height variation, a width variation, an angularity variation, and a rotational variation between the female member and the male member.

* * * * *